Aug. 3, 1954 L. J. H. BALLINGER 2,685,154

DRIVE MEANS FOR ROTARY CUTTING TOOLS

Filed June 18, 1952

2 Sheets-Sheet 1

Inventor
L. J. H. Ballinger
by Albert Jacobs
Atty.

Inventor
L. J. H. Ballinger
by Albert L. Jacobs
Atty.

Patented Aug. 3, 1954 2,685,154

UNITED STATES PATENT OFFICE 2,685,154

DRIVE MEANS FOR ROTARY CUTTING TOOLS

Lewis John Howell Ballinger, Randwick, near Stroud, England

Application June 18, 1952, Serial No. 294,246

Claims priority, application Great Britain June 18, 1951

2 Claims. (Cl. 51—90)

This invention relates to drive means for rotary cutting tools such as circumferentially cutting abrasive discs or circular saws, hereinafter generally referred to as a disc.

According to the present invention a machine of the kind described comprises means for superposing on the normal cutting and feeding motion of the disc relative to the work-piece a low amplitude reciprocating motion, whose frequency is different from the rotational frequency of the disc.

The said reciprocating motion causes the disc to contact the work-piece intermittently and whilst the disc is moved clear of the work-piece an adequate amount of coolant may enter between the disc and work-piece.

The difference between the frequencies of the reciprocating motion and the rotation of the disc causes successive contacts with the work-piece to be made by successive portion of the disc circumference. This ensures concentric wear of the disc and further ensures a resting and complete cooling of that part of the disc circumference which has contacted the work-piece at any particular interval.

Means for superposing the said relative reciprocating motion on the normal motion of the disc may comprise guide means for off-setting the disc from its normal centre of rotation and constraining it in the path of a closed curve in the plane of operation of the disc.

Preferably the said guide means comprise an eccentric member adapted to constrain the centre of rotation of the disc in a circular path.

The curved character of the reciprocating motion ensures that the curved path cut by the disc circumference in the work-piece is of a less acute curvature than the radius of the disc. Thereby only a small circumferential area of the disc is at any time in contact with the work-piece. This ensures that a coolant is close to the centre of the cutting area, that particles broken from the abrasive disc are rapidly washed away and do not wear the disc and render the cutting inefficient by rolling between the disc and the work-piece, and that identical and moderate feed pressures may be used for any size or variation in size of the work-piece.

The effects set out above are particularly desirable in abrasive disc cutting operation; they increase the efficiency of the process, reduce disc wear and by more effective cooling protect the bonding of the disc and prevent heating of the work-piece.

More particularly according to the invention drive means for rotary cutting tools comprise a first drive spindle adapted to rotate the disc through the intermediary of a flexible coupling, a second drive spindle adapted to offset the centre of the disc in a circular path relative to the centre of the first spindle through the intermediary of an eccentric, the two spindles having different rotational speeds.

It is some times required to vary the amplitude of the reciprocating motion to suit the kind of material to be cut or the type of cutting tool employed. Also it may be required to be able to change over from a reciprocating motion to an ordinary concentric motion on the same machine, which is desirable, for example, where the cutting tool is a circular saw which must be run concentrically when being sharpened. To this end means are provided for varying the amplitude of the reciprocating motion between zero and a maximum.

Various constructional forms of the present invention will now be described with reference to the accompanying drawings, wherein.

In the drawings like parts are given like reference numerals.

Figures 1, 2:
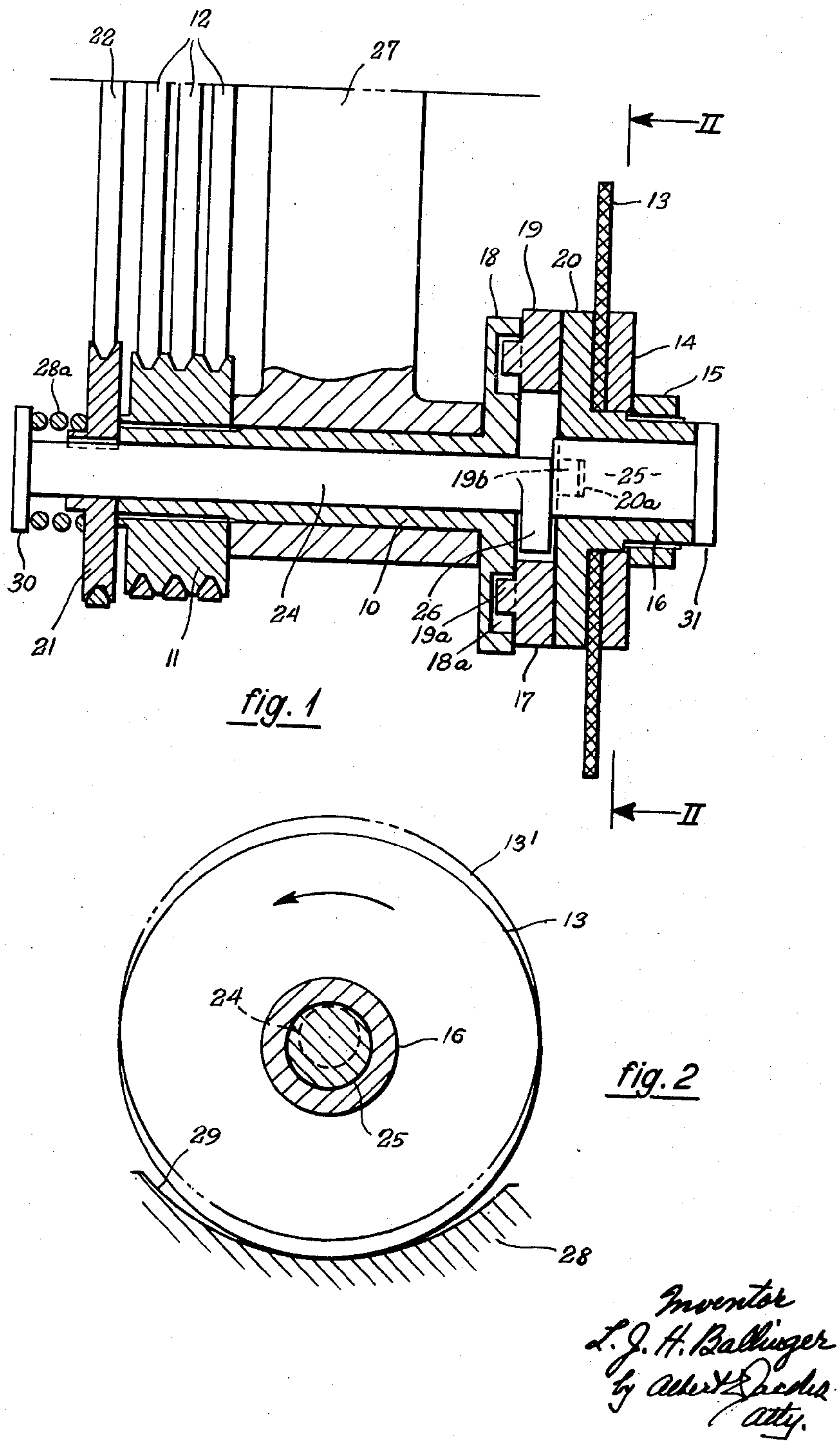
Fig. 1 is a sectional plan view of the cutting head assembly of an abrasive wheel cutting machine.
Fig. 2 is a diagrammatic end view sectioned on the lines II—II in Fig. 1.

Referring to Fig. 1 of the drawings, the cutting head assembly comprises the following arrangement. A tubular main spindle 10 has splined thereto a driven pulley 11 of a belt drive 12. A cutting disc 13 is secured by a plate 14 and a nut 15 to a flanged bush 16. The main spindle 10 and the bush 16 are associated by an Oldham coupling 17, having an input member 18 secured to the spindle 10, an annular intermediary member 19, and an output member 20 which is formed in the flanged part of the bush 16. The input member 18 is provided with radial slots 18*a* engaged by lugs 19*a* of the intermediary member 19 whose lugs 19*b*, which are situated on a diameter at right angles to the diameter on which the lugs 19*a* are situated, engage slots 20*a* in the output member 20. A driven pulley 21 of a belt drive 22 is splined to a secondary spindle 24 which is located for independent concentric rotation in the spindle 10. An eccentric 25, which forms an integral part of the spindle 24, provides a journal for the bush 16. The eccentric 25 is counterbalanced by an extension 26 on the spindle 24. The spindle 10 is journalled for rotation in an arm 27 which is adapted to move the cutting head in the conventional feed and return motion in respect of a work-piece 28 shown in Fig. 2. A spring 28*a* is provided to take up any axial slack of the assembly between end collars 30 and 31 on the spindle 24.

It will be appreciated that the movement of the eccentric 25 is superposed on the rotation of the disc 13, which is permitted by the installation of the Oldham coupling 17. Therefore, in operation, the rotating disc 13 is caused to contact the work-piece 28 intermittently as indicated by the alternative position 13′ of disc 13 in Fig. 2. The radius of a path 29 cut into the work-piece 28 is equal to the radius of the disc 13 plus the eccentricity of the eccentric 25.

The speed of the spindle 24 is adapted to take place in the same direction but slightly slower than that of the main spindle 10 by a suitable arrangement of different sized pulleys. Alternatively, the spindle 24 may be adapted to run slightly faster than the spindle 10, the main object being that the speeds of the two spindles should differ.

The speed ratios of the two spindles are chosen so that the centres of successive cutting areas on the circumference of the disc are one to two degrees apart. The amplitude of the intermittent contact motion is sufficiently small and its frequency is sufficiently high not to interfere with the normal feeding movement of the cutting head.

In the drawing the eccentricity of eccentric 25 and the cutting radius 29 in the work-piece 28 are exaggerated for clarity.

The disc 13 may be additionally secured to the bush 16 by key means not shown in the drawing.

Figures 3, 4, 5, 6:
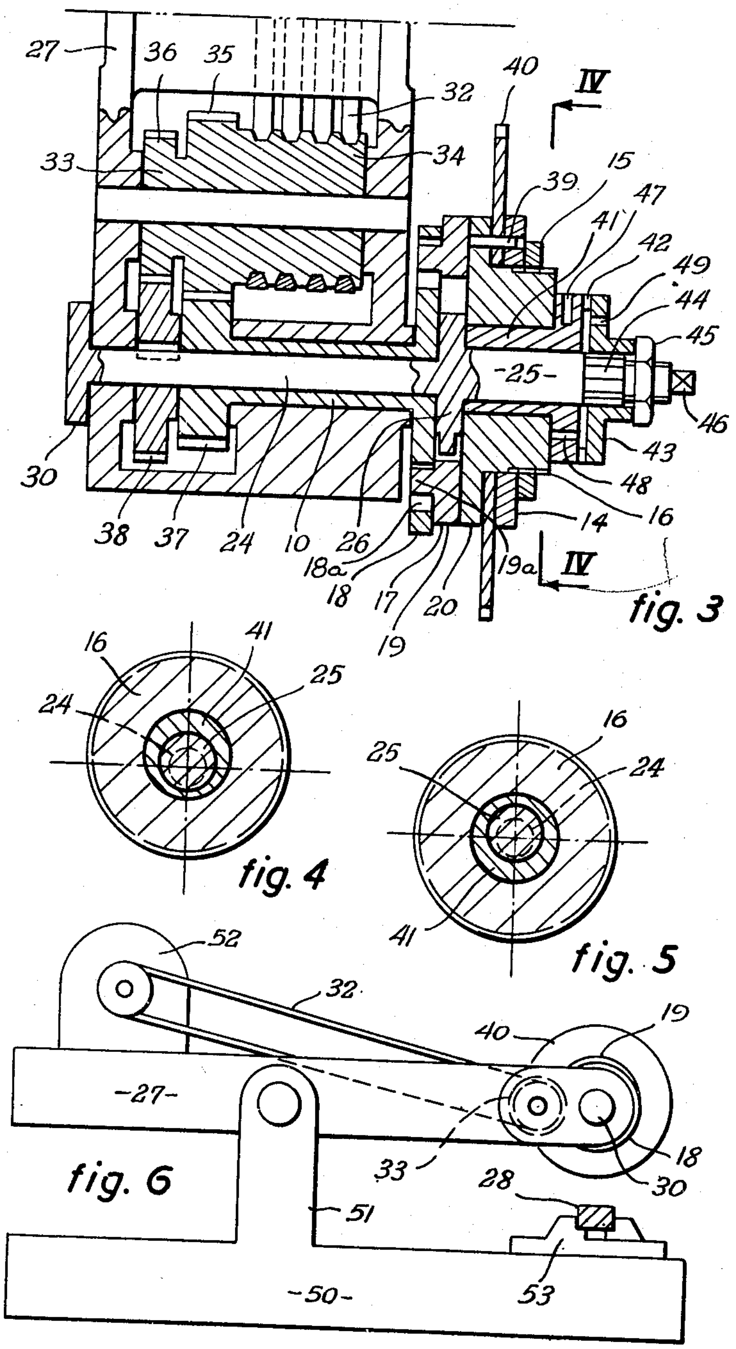
Fig. 3 is a sectional plan view of a modified form of cutting head.
Fig. 4 is a section on the lines IV—IV in Fig. 3.
Fig. 5 is a section similar to Fig. 4 but showing the mechanism in an alternative setting.
Fig. 6 is a side elevation of a cut-off machine, illustrating diagrammatically the general context within which the invention is used.

Referring to Fig. 3, the cutting head assembly comprises the arm 27 formed to accommodate a rotary member 33 forming a driven pulley 34 of a belt drive 32, gear wheels 35 and 36 which mesh, respectively, with a driven gear wheel 37 on the hollow spindle 10 and a driven gear wheel 38 on the internal spindle 24. The gear wheel 35 is of a greater diameter than the gear wheel 36 and the gear wheel 37 is of a smaller diameter than the gear wheel 38, hence the spindle 10 will run at a faster speed than the spindle 24. A pin 39 is secured in the output member 20 and extends through a hole in a circular saw 40 and the plate 14.

The use of the toothed gearing 35, 37 and 36, 38 ensures that the predetermined speed difference between the spindles 10 and 24 is accurately maintained at all times. This makes this form a preferable one for cases where heavy cutting resistance is encountered, particularly when using a cutter of the circular saw type. Moreover, to prevent slip of the saw relative to the output member 20, the pin 39 is introduced.

A means for varying the amplitude of the eccentric motion comprises a rotatable eccentric bush 41 secured on the eccentric 25 by serrations 42 on one end face of the bush 41 engaging corresponding serrations on a flange 43 which is splined for axial movement to an extension 44 of the eccentric 25, a nut 45 being provided to tighten the flange 43 against the serrated end of the bush 41 and keep it in position, the other end of the bush 41 abutting the extension 26 of the spindle 24. The eccentric bush 41 and the eccentric 25 have the same eccentricity. In one angular position of the bush 41 (Figs. 3 and 4) the total eccentricity imparted to the output member 20 is the sum of the two eccentricities, this being the maximum. In a diametrically opposite position of the bush 41 (Fig. 5) the total eccentricity is zero, i. e. the output member 20 runs concentrically. Intermediate angular positions of the bush 41 give a range of eccentricity between the said maximum and zero. To vary the eccentricity, the nut 45 is slackened, the flange 43 is withdrawn from engagement with the serrations 42, the spindle 24 is held at a square extension 46 by means of a spanner and the bush is rotated by means of a tommy bar engaging in radial holes 47 of the bush. Indicia may be provided in respect of the flange 43 and the bush 41 to indicate the angular position of the bush. To locate the position of zero eccentricity in a positive way, two axial holes 48 and 49 provided, respectively, in the bush 41 and the flange 43 are so positioned that the two holes are in line when the eccentricity is zero and a pin may be inserted into the holes to locate the bush 41 positively in that position before tightening the nut 45.

A particular advantage arises when drive means according to this invention are used for circular saws or like toothed cutters. As is known, each tooth of the saw must form a rake or clearance angle between the area immediately behind the cutting edge and the work-piece. When the saw has to be sharpened, each tooth must be ground individually in order to maintain said rake angle on the teeth.

With means according to this invention no such rake angle is required on the teeth because the radius of the cut is greater than the radius of the saw (see Fig. 2) and a rake angle is automatically formed between the teeth and the work-piece. This means that the saw may be sharpened simply by rotating the saw with a continuous concentric motion relative to a grinding wheel which greatly reduces the cost of sharpening as compared with the individual sharpening of the teeth. To prepare the saw for being thus sharpened, the bush 41 is set for concentric motion and the saw need not be removed from the cutting head.

Referring to Fig. 6, a cutting head assembly as shown in Fig. 3 is embodied in a cut-off machine which comprises a bed 50 provided with a pillar 51 to which the arm 27 is pivotally attached. An electric motor 52 is mounted on the remote end of the arm 27 and actuates the belt drive 32. A vise 53 is shown securing the work-piece 28. In operation, the arm 27 is pivotally lowered and fed on to the work-piece to effect the cut-off operation. Instead of being mounted for pivotal movement, the arm 27 may be mounted for linear motion in any known manner.

What I desire to secure by Letters Patent is:

1. Drive means for rotary cutting tools comprising a sleeve, a hollow drive spindle mounted for concentric rotation and in end to end driving connection with said sleeve, a cutting tool mounted on the sleeve, a coupling between the spindle and the sleeve permitting transverse movement of the sleeve relative to the spindle, a shaft disposed concentrically in the spindle and provided with an eccentric portion journally supporting the sleeve, an eccentric bush, which has the same eccentricity as the said eccentric portion, secured on the said eccentric portion, the exterior of the eccentric bush journally supporting the said sleeve, means for adjusting the angular position of the eccentric bush relative to the said eccentric portion of the shaft, and driving means for rotating the spindle and the shaft at different speeds relative to each other.

2. In a cutting machine of the character described, a bed having work-holding means, an arm over said bed movable towards and away from said bed and having a bearing disposed over the work holding means, a sleeve, a hollow spindle mounted through said bearing for concentric rotation and disposed in end-to-end relation to said sleeve, a cutting tool removably mounted about said sleeve, a coupling between said spindle and said sleeve permitting restricted transverse movement of the sleeve relative to the spindle, a shaft rotatably mounted through said spindle concentric thereto, and provided with an eccentric portion about which the sleeve is rotatably mounted, and means for rotating said spindle and said shaft at different speeds relative to each other.

References Cited in the file of this patent

UNITED STATES PATENTS

| Number | Name | Date |
|---|---|---|
| 1,123,168 | Combs | Dec. 29, 1914 |
| 1,132,196 | Lindner | Mar. 16, 1915 |
| 1,408,578 | Garner | Mar. 7, 1922 |
| 1,687,965 | Ainley | Oct. 16, 1928 |
| 2,116,498 | Hall | May 10, 1938 |
| 2,602,374 | Hlinsky | July 8, 1952 |
| 2,616,336 | Holstein | Nov. 4, 1952 |

FOREIGN PATENTS

| Number | Country | Date |
|---|---|---|
| 6,205 | Great Britain | Nov. 27, 1909 |
| 599,998 | Great Britain | Mar. 25, 1948 |